Oct. 27, 1925.  1,559,535

G. R. RODDY ET AL

ENDLESS TRAVELING WATER SCREEN

Filed April 23, 1923   3 Sheets-Sheet 1

Inventors
Gustav R. Roddy,
Reginald J. Hickman.

By John S. Barker
Attorney

Oct. 27, 1925.

G. R. RODDY ET AL

ENDLESS TRAVELING WATER SCREEN

Filed April 23, 1923   3 Sheets-Sheet 2

1,559,535

Inventors
Gustav R. Roddy,
Reginald J. Hickman.

By John S. Barker

Attorney

Oct. 27, 1925.  1,559,535
G. R. RODDY ET AL
ENDLESS TRAVELING WATER SCREEN
Filed April 23, 1923  3 Sheets-Sheet 3
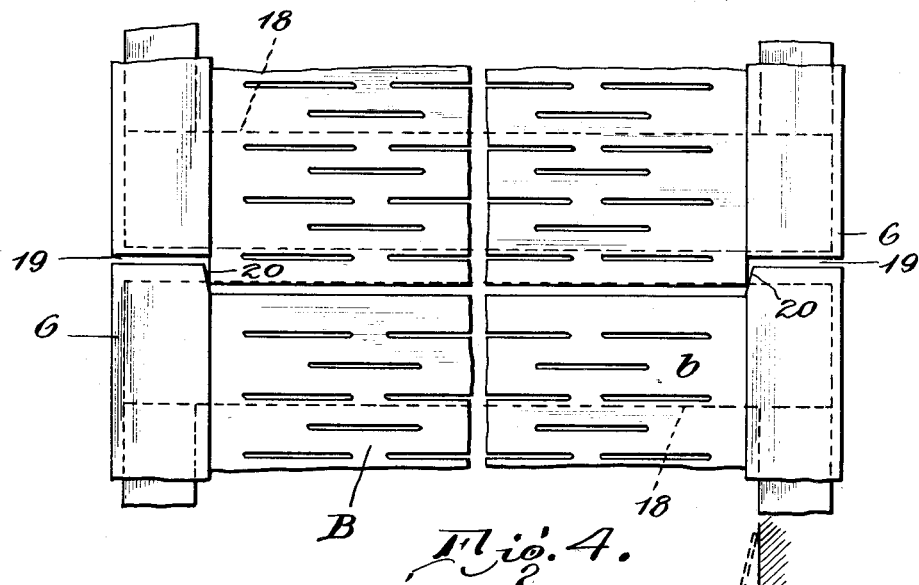
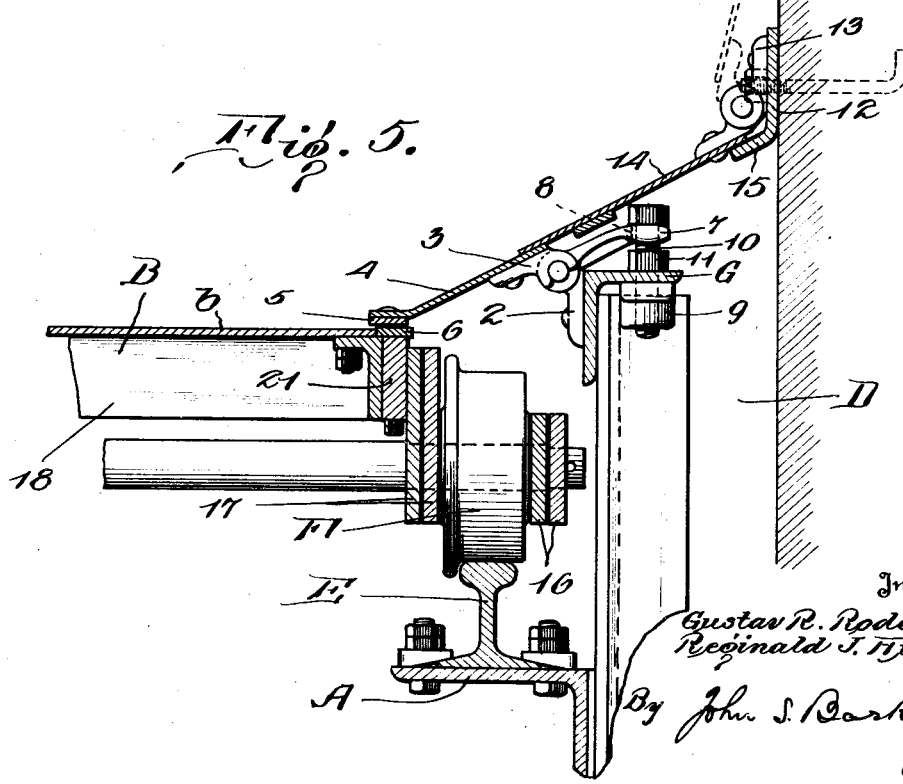

Patented Oct. 27, 1925.

1,559,535

UNITED STATES PATENT OFFICE.

GUSTAV R. RODDY AND REGINALD J. HICKMAN, OF MILWAUKEE, WISCONSIN, ASSIGNORS TO CHAIN BELT COMPANY, OF MILWAUKEE, WISCONSIN, A CORPORATION OF WISCONSIN.

ENDLESS-TRAVELING WATER SCREEN.

Application filed April 23, 1923. Serial No. 634,002.

*To all whom it may concern:*

Be it known that we, GUSTAV R. RODDY and REGINALD J. HICKMAN, the former a citizen of the United States, and the latter a subject of the King of Great Britain, both residing at Milwaukee, in the county of Milwaukee and State of Wisconsin, have invented certain new and useful Improvements in Endless-Traveling Water Screens, of which the following is a specification.

This invention relates to endless traveling water screens such as are employed to treat sewage, water taken from streams and used for industrial purposes, etc.

In the use of apparatus of this kind the water to be screened is usually taken through a channel comprising a chamber into which one end of the screen is inserted, while its upper end extends above the liquid level, that the material collected may be the more easily removed. A common form of liquid screen consists of a series of perforated metal plates secured to endless chains and operated so that the upwardly moving run thereof is the one that performs the separating action. Such a screen is usually mounted in a rigid frame carrying the wheels with which the chains that carry the screening plates engage, and this is usually hinged, so that the frame may be let down into the screening chamber of the waterway or may be lifted therefrom when not in use or when requiring repairs.

When apparatus of this kind is in use, the water upon one side of the screen,—the side toward the intake of the conduit—is fouled with the material the screen is intended to remove, while that on the other side, having passed through the screening surface, is cleansed of the material the screen removes; and in order that the separation between the screened and unscreened bodies of water may be maintained as perfect as possible, so as to insure that all the water that flows through the conduit shall pass through the screening surface, and not around the sides or ends thereof, various sealing means have been devised, an example being illustrated in Patent #1,417,205 of May 23, 1922 to Gustav R. Roddy, assignor to Chain Belt Company of Milwaukee, Wisconsin; and another example in Patent #1,435,770 of November 14, 1922 to George B. Welser, Jr., also assignor to Chain Belt Company.

The present invention relates to improved means for sealing spaces through which liquid might pass without being subjected to the screening operations.

In the accompanying drawings the invention is illustrated in connection with a flume screen similar to that shown in the aforesaid Patents Nos. 1,417,205 and 1,435,770.

Fig. 4 is a detail plan view illustrating the condition of the screen plates and wear plates carried by the screen after the chains of the screen have become worn.

Fig. 5 is a transverse sectional view similar to Fig. 2 but on a much larger scale, and showing but one side of the screen.

Figure 1:
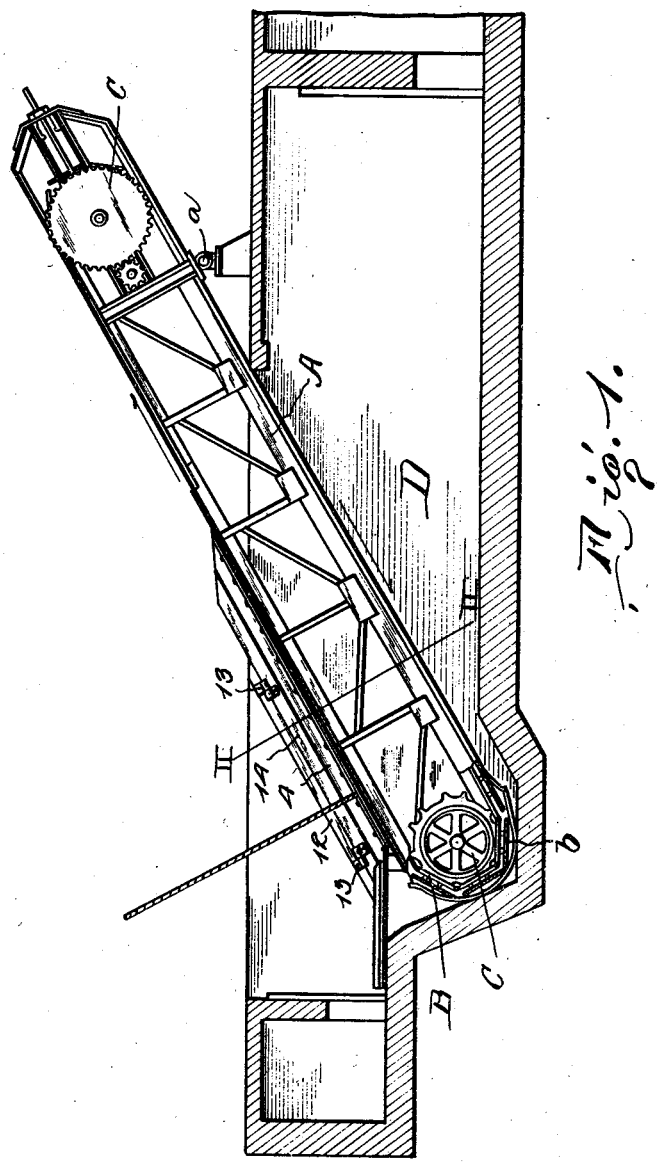
Figure 1 is a side view, parts being in section, of the liquid screen, parts not necessary to an understanding of the invention being omitted.

In the drawings A represents a frame, hinged at $a$, in which operates an endless traveling liquid screen B. In the frame are mounted the wheels C on which is supported the screen and about which it turns. The parts thus far referred to may be of widely different specific construction, and therefore are not illustrated in detail. The free end of the frame A is adapted to be lowered into a chamber D through which the liquid to be screened flows. This chamber is usually built of concrete, and is of a little greater width than the screen and its frame A.

The direction of movement of the screening surface is indicated by arrows, the uprun thereof being the working portion; and the body of the liquid above the line of the said uprun and toward the foot or free end of the screen is the unscreened liquid, while that on the opposite side is the body of the cleansed liquid.

In order to form cut offs or seals separating these bodies of liquid at each side of the screen, and between the side walls of the liquid chamber and the screen framework, and also between the screen framework and the side edges of moving screen proper, we have devised and combined the arrangement we will now describe.

To the submerged portions of the longitudinal frame pieces G, which are preferably of structural angle metal, are secured hinges, the fixed members of which are designated 2, the movable members 3. Plates 4 are secured to the hinge pieces 3, and extend downward and inward to the edges of the traveling screen B. 5 represents wear plates, secured to the lower edges of the plates 4 and arranged to overlie wear plates 6 carried by the screen B. The movable hinge member 3 is formed with an arm 7, that preferably extends over the upper member or flange of the frame piece G. This arm is perforated at 8, and through this perforation extends a headed screw 10, which is seated in a screw-threaded piece 9 secured to the frame piece G. The perforation 8 through the arm 7 is of larger diameter than the stem of the screw 10 so that the hinge piece 3 is free to move in one direction, but is restrained from movement in the opposite direction by the head of the screw. The weight of the plate 4 is sufficient to normally hold the arm in engagement with the head of the screw, but should the edge of the moving screen over which the edge of the plate lies, for any reason, rise, or should it carry any projection, these would not interfere with the sealing of the edges of the screen, as the plate 4 would be lifted, this being permitted by the construction just described. Lock nuts 11 may be used upon the screws 10, if found desirable.

Figure 2:
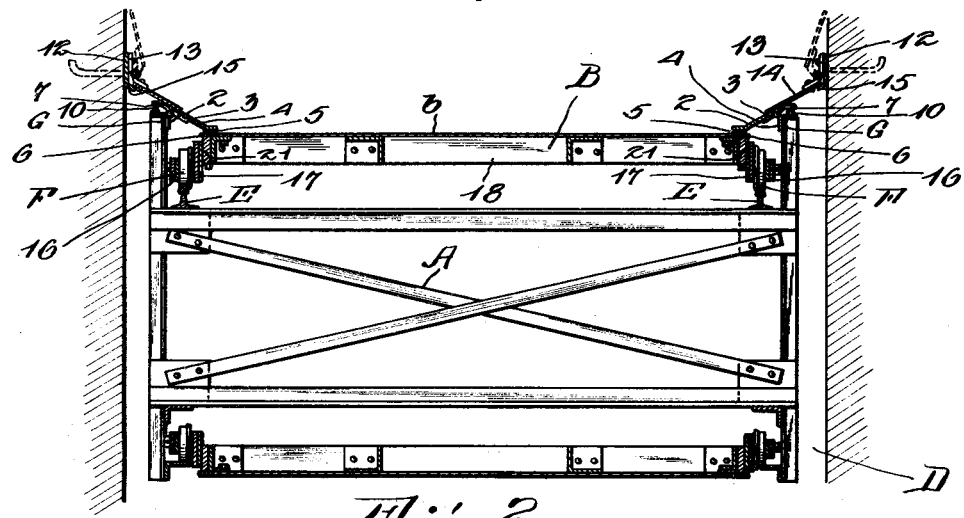
Fig. 2 is a transverse sectional view, taken on the line II—II of Fig. 1, and on a much larger scale.

12 indicate plates set into the side walls D, parallel with, but preferably above, the side edges of the screen when let down into the liquid and in working position. To the plates 12 are secured hinges 13, the movable members of which carry plates 14. The inner edges of these plates rest upon the outer edges of the plates 4, and their outer edges rest upon the upper surfaces of flanges 15 of the plates 12. The plates 14 and 4 incline downward from the side walls D of the liquid chamber close to the edges of the traveling screen B, the angles of the two plates, relative to the side walls D being preferably the same. The outer plates overlie the heads of the screws 10, but they may be turned up, as indicated in dotted lines Fig. 2, to give access to the screws. By turning these screws in their seats 9 the plates 4 may be adjusted relative to the screen to give more or less clearance between these parts, or to permit the wearing plates 5 and 6 to come into engagement.

It will be understood that any suitable driving mechanism may be used to turn one set of wheels C and thus drive the screen B, and that the latter may be provided with wheels F which run on rails E mounted in the framework A. The cut offs at each side of the filter or screen are held in working position by gravity, and the inner sections, 4, thereof are adjustable, as has been described. They form cut offs between the filtered and unfiltered bodies of liquid, which effectively prevent any passage of the liquid around the side edges of the screen, necessitating that all the liquid that flows through the chamber in which the filter is located shall have to pass through the filter plates b.

Figure 3:
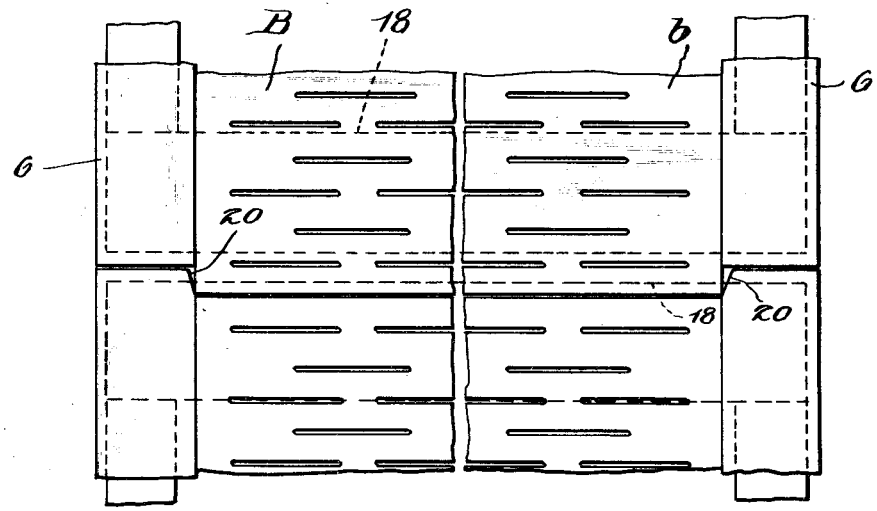
Fig. 3 is a plan view of a section of the screen, the cut off located between the moving screen and the walls of the chamber in which the screen works being omitted.

As shown and described in the aforesaid patent to Welser #1,435,770, the chains that support and carry the screen plates b are formed of articulated links composed of outer side bars 16 and inner side bars 17, the latter being wider than the former so that the screen plates, which are supported by the inner side bars, shall lie relatively high with reference to the wheels F of the chains, thus permitting the cut-off plates to extend over the chains and their wheels and engage with the outer surfaces of the screen plates. The ends of the screen plates are supported upon transverse bars 18 and one end of each plate, preferably the leading end thereof, extends only partly across the bar 18 of the link to which the plate is secured, while the adjacent end of the next screen plate in advance extends entirely across its transverse supporting bar 18 and sufficiently beyond to overlie the cross bar of the next succeeding link, the one first referred to, so that its edge meets the leading edge of the first mentioned plate over the said first bar. This arrangement is fully described in the said Patent #1,435,770 to Welser. Experience has shown that in use the links of the chains, and the connections that unite them, wear, so that the distance between centers of articulation increases, leaving spaces between the adjacent ends of the links as represented at 19 in Fig. 4. But by arranging the ends of the screen plates as described, so that the joints between them are above the cross bars 18, no cross leakage results from the increasing spaces between the ends of the screen plates as the supporting and carrying chains wear. However, it has been found that some leakage does occur at the sides of the screens, as the plates separate due to wear of the carrying chains. This source of leakage is stopped by arranging the wear strips 6, which are carried by the chains, as represented in Figs. 3 and 4, where it will be seen that the strips and screen plates break joints, that is, their respective abutting ends are not in line with each other, but rather offset. From Fig. 4, where are represented the ends of two adjacent screen plates and two wear plates that have separated, due to wear of the supporting carrying chains, it is apparent that the spaces opened at the sides of the screen as the plates *b* separate are covered by the wear plates 6, and hence flow of unfiltered liquid at these points is prevented.

The wear strips or plate 6 are preferably a little thicker than are the screen plates *b*. In operating a traveling screen of the kind herein described, there is always more or less sidewise vibration and movement of the traveling parts, and by making the wear strips thicker as stated the wear plate 5 and 6 may remain in proper working engagement, notwithstanding the sidewise movements of the traveling screen and uniform wear and constantly maintained smooth wearing surfaces are insured. The inner corners of the leading ends of the wear plates or strips are chamfered as indicated at 20 in order to prevent these ends of the wear strips from binding as they leave the sprocket wheels. The chains open in going over the sprocket wheels and close again on leaving and as they reach the straight runs, and this chamfering of the corners of the wear strip prevents any binding. But a slight chamfer is required to secure the desired result.

The side edges of the screen plate *b* and the wear plates 6 located at the edge of such plates are represented as being supported by attachments 21 carried by the inner side bars 17 of the chain links. These attachments could be integral with the side bars, but are preferably formed of separate parts secured to the inner faces of the side bars of the links. It is important that the screen plates and the wear strips be supported by the upper edges of the links in order that they may be sufficiently raised to permit the cut offs at the sides of the moving screen to overlie the edges of the moving screen and thus prevent leakage of unscreened liquid as described. The cut off plates 14 may be turned up out of the way as indicated in dotted lines in Figs. 2 and 5 and the cut off plates 4 easily removed, the hinge elements 3 carried by these plates being preferably open as shown to permit easy removal, thus giving access to the parts of the filter chamber below the cut off plates.

It is evident that certain of the features of the invention herein described may be used without necessarily being in combination with others; as for instance, the hinged and adjustable cut off plate 4 could be used with moving screening apparatus provided with other forms of cut off between the screen frame and the walls of the chamber in which the apparatus operates from that shown in the drawings, or even it might be used in apparatus in which no outside cut off at all are employed.

Or the wearing plates 5 and 6 might be employed in connection with cut off devices such as are shown in the Welser Patent 1,435,770 already referred to, as well as with cut offs of the specific form herein shown.

What we claim is:—

1. In a liquid screening apparatus comprising a chamber through which flows the liquid to be screened and a frame carrying an endless moving screen, cut off means to separate the unscreened from the screened liquid located between the chamber walls and the edges of the screen, each cut off formed in two parts, one hinged to the chamber wall and extending to the screen frame, and the other hinged to the screen frame and extending to the edge of the moving screen.

2. Liquid screening apparatus such as described in claim 1 in which the part of the cut off hinged to the chamber wall laps an edge of the other hinged part, and the latter laps an edge of the moving screen.

3. In a liquid screening apparatus comprising a frame adapted to be immersed in the liquid to be screened and an endless moving screen mounted therein, a cut off for separating the unscreened body of liquid from the screened body thereof lapping a side edge of the moving screen, and means for adjusting the cut off relative to the screen.

4. Liquid screening apparatus such as described in claim 3, in which the cut off is hinged to the frame in which the moving screen is supported.

5. In a liquid screening apparatus comprising a frame and an endless moving screen mounted therein, a cut off for closing the space between a moving edge of the screen and the frame and hinged to the frame.

6. Liquid screening apparatus such as described in claim 5, in which the hinged cut off overlaps the edge of the moving screen and is held in working position by gravity.

7. Liquid screening apparatus, such as described in claim 5, in which the edges of the moving screen and of the cut off are respectively provided with wear plates which lap over each other.

8. Liquid screening apparatus such as described in claim 5, in which the hinges of the cut off are provided with arms, and screws engaging such arms for adjusting the cut off relative to the screen.

9. Liquid screening apparatus such as described in claim 8, in which the adjusting screws are headed and pass through apertures in the arms of the hinges which are larger in diameter than the screws.

10. In combination with apparatus such as described in claim 8, hinged cut off plates outside the screen frame and overlying the adjusting screws.

11. In a liquid screening apparatus comprising an endless moving screen, wear strips at the edges of the screen, cut offs at the sides of the moving screen for preventing the flow of unscreened liquid around the edges of the moving screen, and wear strips carried by the cut offs overlying and adapted to engage with the wear strips at the edges of the screen.

12. In a liquid screening apparatus, an endless moving screen comprising separate screening plates, wearing strips located at the edges of the screening plates of greater thickness than the screening plates, and cut offs for preventing the flow of unscreened liquid around the edges of the screen, bearing upon the wear strips at the edges of the screening plates.

13. In a liquid screening apparatus, an endless moving screen formed of separate screening plates, wearing strips at the edges of the screening plates of greater thickness than the plates, cut offs at the sides of the moving screen for preventing flow of unscreened liquid around the edges of the screen, and other wearing strips carried by the cut offs engaging with the moving wearing strips at the edges of the screening plates.

14. In a liquid screening apparatus, an endless traveling screen, comprising supporting chains of articulated links, screening plates carried by the chains arranged so that their transverse edges come close together, and strips at the sides of the screening plates also carried by the chains, the strips breaking joints with the screening plates whereby as the spaces between the transverse edges of the screening plates increase due to wear of the chains, such spaces will be maintained closed at their ends by the strips at the sides of the screening plates.

15. In a liquid screening apparatus, an endless moving screen comprising articulated chains and screening plates carried thereby, wear strips at the side edges of the plates also carried by the chains, the corners of the strips toward the screening plates being chamfered to prevent the strips from binding as the chains flex in their movements.

GUSTAV R. RODDY.
REGINALD J. HICKMAN